G. C. WORTHINGTON.
GOLF BALL AND SIMILAR ARTICLE.
APPLICATION FILED JUNE 4, 1919.
1,369,868.
Patented Mar. 1, 1921.
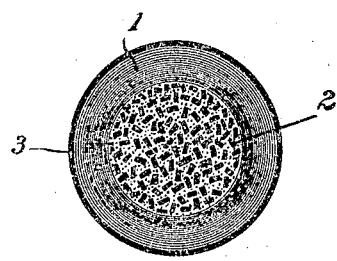
INVENTOR
George C. Worthington
BY Richey + Adams
ATTORNEY

UNITED STATES PATENT OFFICE.

GEORGE C. WORTHINGTON, OF ELYRIA, OHIO.

GOLF-BALL AND SIMILAR ARTICLE.

1,369,868.　　　　　Specification of Letters Patent.　　Patented Mar. 1, 1921.

Application filed June 4, 1919. Serial No. 301,751.

*To all whom it may concern:*

Be it known that I, GEORGE C. WORTHINGTON, a citizen of the United States, residing at Elyria, in the county of Lorain and State of Ohio, have invented certain new and useful Improvements in Golf-Balls and Similar Articles; and I do hereby declare the following to be a full, clear, and exact description of the invention, such as will enable others skilled in the art to which it appertains to make and use the same.

This invention relates to golf balls and similar resilient articles.

In the manufacture of golf balls it is usual to add some heavy material, such as white lead, to the rubber center to get the desired weight. It has always been the practice, as far as I am aware, however, to knead such material directly into the raw rubber from which the center of the ball is to be made. After the white lead has been thoroughly mixed into the stock, the latter is formed into a ball and vulcanized by the usual application of heat and pressure.

I have found in my experiments that the resiliency of the rubber is materially reduced by the white lead or other foreign substance, as it is more or less bulky and has no resiliency in itself. In my endeavors to overcome this disadvantage I have devised a process of making a novel type of ball that is far more active than any other form of ball with which I am familiar. This novel process, as well as the product, will now be described, reference being had to the drawing in which:

The single figure of the drawing represents a section of a golf ball embodying the improvement.

In the production of the novel form of game ball, I take elastic thread rubber, already vulcanized, and cut it into small blocks or sections. The exact proportions of the rubber thread and the blocks are not material to the invention, but excellent results will be obtained by taking thread rubber about one-sixteenth of an inch square in section and cutting it into blocks of about one-sixteenth of an inch in length. This is by way of example only, however, as various sizes of thread and blocks may be used without departing from the spirit of the invention.

The small chunks or blocks of rubber are then mixed with ordinary rubber cement, preferably the non-vulcanizing cement, until all of the blocks are thoroughly covered with it. The weighting material is then kneaded in the mass of rubber cement and on the rubber blocks. Since the blocks are elastic rubber, the weighting material cannot become incorporated therein to impair their resiliency. While any heavy material may be used in the production of the ball of my novel process, I prefer wolframite, on account of its high specific weight. The wolframite is preferably ground into fine powder before it is mixed with the other materials, so as to aid in its thorough dissemination through the rubber cement. After the wolframite, or other heavy material, is mixed as previously described, the mass is allowed to set by the evaporation of the rubber solvent in the cement and the desired quantity is cut out and worked up into a suitably sized core of general spherical shape, to make the center of the golf ball.

While various sizes of rubber centers may be used, I have found for golf balls that good results are obtained with a center about one and one-eighth inches in diameter before it is compressed by the winding process, during the subsequent steps in the manufacture of the complete ball. Additional material may be added to the outside of the rubber center in various ways to produce the final article, but I prefer to wind it with vulcanized non-weighted rubber thread 1, until the desired size is obtained, as disclosed in my Patent #1,285,878, Nov. 26, 1918. The rubber core containing the rubber blocks 2 is compressed about one-eighth of an inch in diameter by this winding process, for a ball of the diameter previously specified.

After the rubber thread 1 is wound on the outside of the center, a shell or cover 3 of any desired material, preferably balata, may be molded or otherwise affixed to the exterior by any process.

By my improved process of making a golf ball I am enabled to maintain the original resiliency of the rubber in the center, while securing all of the advantages of using a weighting material. The improved ball, therefore, is very lively and longer drives can be made with it than with former types of balls.

While I have specified wolframite as the preferable heavy material to be incorporated in the center of the ball, I, nevertheless, am not limited to this material. As alternative substances I may use heavy salts, oxids, or metals, such as white lead, litharge, powdered lead, powdered tungsten, etc. I have found wolframite or powdered tungsten to be advantageous, however, because they have no effect on the rubber associated therewith. I believe I am the first to use wolframite or tungsten material in golf balls, and I may use it in other ways than in the preferred process disclosed herein.

Having described my invention, what I claim is:

1. The process of making resilient balls, which consists in mixing blocks of resilient rubber with rubber cement and weighting material, winding an outer layer of resilient material therearound and then applying a protecting shell.

2. The process of making resilient balls, which consists in mixing small blocks of resilient rubber with rubber cement and wolframite, drying the material, winding thread rubber therearound and applying a protecting cover.

3. A game ball containing particles of resilient rubber, cement around said particles to hold them in position and weighting material in said cement.

4. A game ball containing a core of small blocks of resilient rubber, rubber cement around said particles, wolframite in said cement, resilient thread rubber around said core and a protecting sheath around said thread rubber.

In witness whereof I have hereunto set my hand this 2nd day of June, 1919.

GEORGE C. WORTHINGTON.